United States Patent [19]

Ikeda et al.

[11] Patent Number: 5,712,656

[45] Date of Patent: Jan. 27, 1998

[54] GRAPHIC DRAWING APPARATUS

[75] Inventors: Kazunori Ikeda, Yawata; Michiaki Kuno, Soraku-gun, both of Japan

[73] Assignee: Sharp Kabushiki Kaisha, Osaka, Japan

[21] Appl. No.: 500,327

[22] Filed: Jul. 10, 1995

[30] Foreign Application Priority Data

Aug. 8, 1994 [JP] Japan .................................. 6-186147

[51] Int. Cl.[6] ....................................................... G09G 5/36
[52] U.S. Cl. ............................ 345/133; 345/118; 395/134; 395/140
[58] Field of Search ...................... 345/113, 115, 345/118, 119, 120, 133; 395/132, 134, 135, 140; 364/710.01, 710.14

[56] References Cited

U.S. PATENT DOCUMENTS

| | | | |
|---|---|---|---|
| 5,075,873 | 12/1991 | Seki et al. | 395/140 |
| 5,303,338 | 4/1994 | Handa et al. | 395/140 |
| 5,535,316 | 7/1996 | Shinoaki et al. | 395/134 |

FOREIGN PATENT DOCUMENTS 61-292679  12/1986  Japan .

*Primary Examiner*—Mark R. Powell
*Assistant Examiner*—Matthew Luu
*Attorney, Agent, or Firm*—Nixon & Vanderhye, P.C.

[57] ABSTRACT

Depiction of graphics which are displayed in combination with function graphs is accelerated. Graphics to be displayed on a display device in combination with function graphs are selected and drawn according to the graphic information stored in the graphic information storage area of the data storage RAM memory. The selection is executed based on whether the rectangular region of interest is even partially within the region to be displayed on the screen. The selected graphics are written to the display RAM as bit images by a CPU which operates under the direction of programs set in the program ROM, and displayed on a display device. The data in the graphic information storage area is displayed on a display device upon pressing an EDIT MODE key, edited by operation with an EDIT key, DELETE key, character keys, etc., and the display device is switched to the graphic screen with the modified graphic thereon, upon repressing the EDIT MODE key.

6 Claims, 16 Drawing Sheets

PRESS [PLOT] KEY

[◄] [◄] [◄] [▲]
[▲] [▲]

PRESS [ENTER] KEY

PRESS [BOX] KEY

PRESS [ENTER] KEY

PRESS [ENTER] KEY

PRESS [CIRCLE] KEY →

[▼]
PRESS [ENTER] KEY ↓

[▼] [▼]
[▶] [▶] ↓

← PRESS [ENTER] KEY

[▶] [▶] [▶] ↓

← PRESS [ENTER] KEY

PRESS [F-LINE] KEY

PRESS [ENTER] KEY
[▶] [▶] [▲]

PRESS [ENTER] KEY

[▼] [▼] [▼]
[▶]
PRESS [ENTER] KEY

PRESS [CIRCLE] KEY

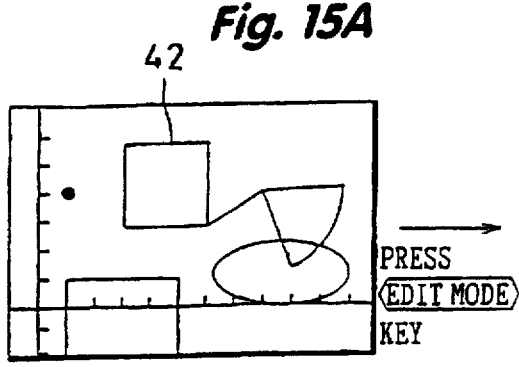

Fig. 15B

| DISPLAY | GRAPHIC SHAPES | PARAMETERS |
|---|---|---|
| ○ | PLOT | 1, 4 |
| ○ | BOX | 3, 3, 6, 6 |
| △ | BOX | 1, 1, 5, -10 |
| × | PLOT | 20, 30 |
| × | LINE | -2, -2, -5, 1 |
| ○ | ELLIPSE | 6, 2, 11, 0 |
| ○ | F-LINE | 6, 3, 8, 4, 9, 1 |
| | | CIRCLE, 11, 4, 8, 4 |

PRESS [EDIT MODE] KEY →

PRESS [EDIT] KEY ↓

Fig. 15C

| DISPLAY | GRAPHIC SHAPES | PARAMETERS |
|---|---|---|
| ○ | [PLOT] | 1, 4 |
| ○ | BOX | 3, 3, 6, 6 |
| △ | BOX | 1, 1, 5, -10 |
| × | PLOT | 20, 30 |
| × | LINE | -2, -2, -5, 1 |
| ○ | ELLIPSE | 6, 2, 11, 0 |
| ○ | F-LINE | 6, 3, 8, 4, 9, 1 |
| | | CIRCLE, 11, 4, 8, 4 |

| DISPLAY | GRAPHIC SHAPES | PARAMETERS |
|---|---|---|
| ○ | PLOT | 1, 4 |
| ○ | [BOX] | 3, 3, 6, 6 |
| △ | BOX | 1, 1, 5, -10 |
| × | PLOT | 20, 30 |
| × | LINE | -2, -2, -5, 1 |
| ○ | ELLIPSE | 6, 2, 11, 0 |
| ○ | F-LINE | 6, 3, 8, 4, 9, 1 |
| | | CIRCLE, 11, 4, 8, 4 |

PRESS [DELETE] KEY ↓

Fig. 15E

| DISPLAY | GRAPHIC SHAPES | PARAMETERS |
|---|---|---|
| ○ | PLOT | 1, 4 |
| △ | [BOX] | 1, 1, 5, -10 |
| × | PLOT | 20, 30 |
| × | LINE | -2, -2, -5, 1 |
| ○ | ELLIPSE | 6, 2, 11, 0 |
| ○ | F-LINE | 6, 3, 8, 4, 9, 1 |
| | | CIRCLE, 11, 4, 8, 4 |

← PRESS [EDIT MODE] KEY

Fig. 15F

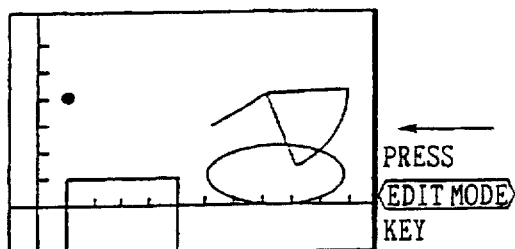

GRAPHIC DRAWING APPARATUS

BACKGROUND OF THE INVENTION

1. Field of the Invention

The present invention relates to a graphic drawing apparatus such as a graphic function calculator constructed with miniature electronic equipment including both functions of drawing figures and function graphs.

2. Description of the Related Art

Electronic equipment of the prior art which is provided with a graph drawing function, such as disclosed in Japanese Unexamined Patent Publication JPA 61-292679 (1986), defines a drawing range which has a wider area than the display range. In other words, only a part of the defined drawing range is processed to be displayed on the screen. According to this prior art, a part of the graph is displayed on the screen by selecting and outputting the X and Y coordinates data of a broken line graph which are required for the display.

In the case where it is attempted to apply the prior art of Japanese Unexamined Patent Publication JPA 61-292679 (1986) to drawing of graphics, it becomes necessary to determine, on a dot-by-dot basis for all the dots each time a graphic is being drawn, whether the respective dots constituting the graphic exist outside a screen. This processing takes much time and makes it difficult to establish high-speed drawing. In addition, in the case where an identical pattern is being used repeatedly, the drawing is performed using a programming language, or it becomes necessary to input the same pattern repeatedly through direct input in an edit mode or by moving the cursor. Furthermore, in the case where the graphic is directly defined as a combination of fundamental patterns, including a plot (Plot), a line (Line), a rectangle (Box), etc., or is drawn using a programming language, only the screen image of the graphic is stored in the screen storage area, and the source information on the graphic is lost upon clearance of the screen. For this reason, in order to draw one or more graphics all together, a plurality of graphic drawing instructions incorporated in a program must be run, in which case drawing processing is needed for all the graphics including those outside the region to be displayed on the screen, resulting in prolonged drawing processing.

SUMMARY OF THE INVENTION

An object of the present invention is to provide a graphic drawing apparatus which allows quick selection and drawing of only the graphics within the region to be displayed on a screen.

The invention provides a graphic drawing apparatus which allows drawing of both figures and function graphs on a graphic drawing plane and allows displaying of a part of the drawing plane on a screen, the apparatus comprising:

screen storage means for storing a region to be displayed on the screen and contents to be displayed;

graphic information storage means for storing information related to the respective drawn graphics, including their forms, parameters of the respective forms and their graphic drawing ranges; and graphic selection means for comparing the graphic drawing range stored in the graphic information storage means with the region to be displayed on the screen stored in the screen storage means, selecting a graphic whose drawing range is within the region to be displayed on the screen at least partially and adding the selected graphic to the contents to be displayed.

The invention is characterized by further comprising graphic drawing means for setting the parameters and the graphic drawing range of the graphic in response to the movement of the cursor on the screen and editing means capable of editing the information on a graphic which is stored in said graphic information storage means.

The invention is characterized in that the graphic drawing range corresponds to the rectangular region circumscribing each graphic and is defined by the coordinates of both endpoints of a diagonal of the rectangular region.

According to the Invention, the graphic information storage means stores information related to the respective drawn graphics, including forms, parameters of the respective forms and drawing ranges. The screen storage means is designed in such a manner that only graphics are selected and stored whose drawing ranges are within the region to be displayed on the screen at least partially, and therefore unwanted graphics are left out of the targets of drawing processing, resulting in high-speed drawing processing of the graphics to be displayed on the screen.

According to the invention, both the parameters and the graphic drawing ranges are set with drawing by movement of the cursor on the screen. Furthermore, since the graphic information stored in the graphic information storage means may be edited by editing means, and thus both inputting and editing of the graphic information are performed with ease.

Further according to the present invention, since the graphic drawing range corresponds to the rectangular region circumscribing each graphic and is defined by the coordinates of both endpoints of a diagonal of the rectangular region, each graphic may be processed with minimum data, and it also becomes easy to determine whether the graphic drawing range is at least partially within the region to be displayed on the screen.

As mentioned above, according to the invention, since in drawing the image corresponding to a function graph on the display screen, selection of graphics to be included in the same region to be displayed on the screen as that of the graph can be performed on the basis of their graphic drawing ranges, high-speed graphic drawing through selection of only desired graphics can be performed.

Also according to the invention, even in the case of the graphics inputted on the screen by movement of the cursor, the information related to the graphic drawing has been converted into numerals and stored in the graphic information storage means, so that editing can be performed by editing means. Therefore graphics to be numerically defined may be easily drawn, modified and stored.

Also according to the invention, since the graphic drawing range corresponds to the rectangular region circumscribing each graphic and is defined by the coordinates of both endpoints of a diagonal of the rectangular region, each graphic can be drawn with reference to a small amount of data, and further comparison with the region to be displayed on the screen may be accomplished with ease.

BRIEF DESCRIPTION OF THE DRAWINGS

Other and further objects, features, and advantages of the invention will be more explicit from the following detailed description taken with reference to the drawings wherein:

FIGS. 15A–15F are schematic diagrams illustrative of the method of deleting a graphic drawn on the graphic screen, on the edit screen.

DETAILED DESCRIPTION OF THE PREFERRED EMBODIMENTS

Figure 1:
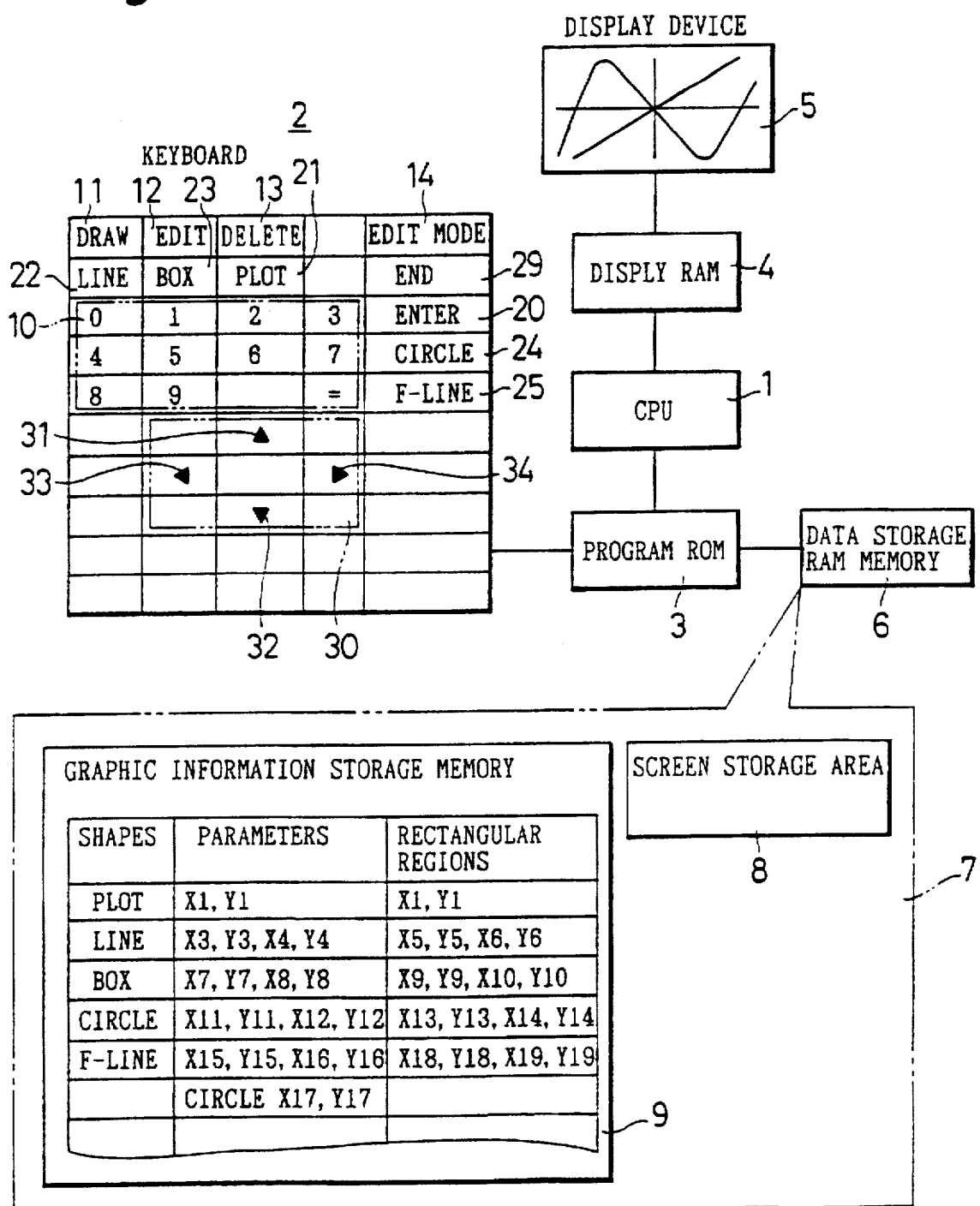
FIG. 1 is a block diagram showing the electric configuration of an embodiment of the invention.
Figure 2:
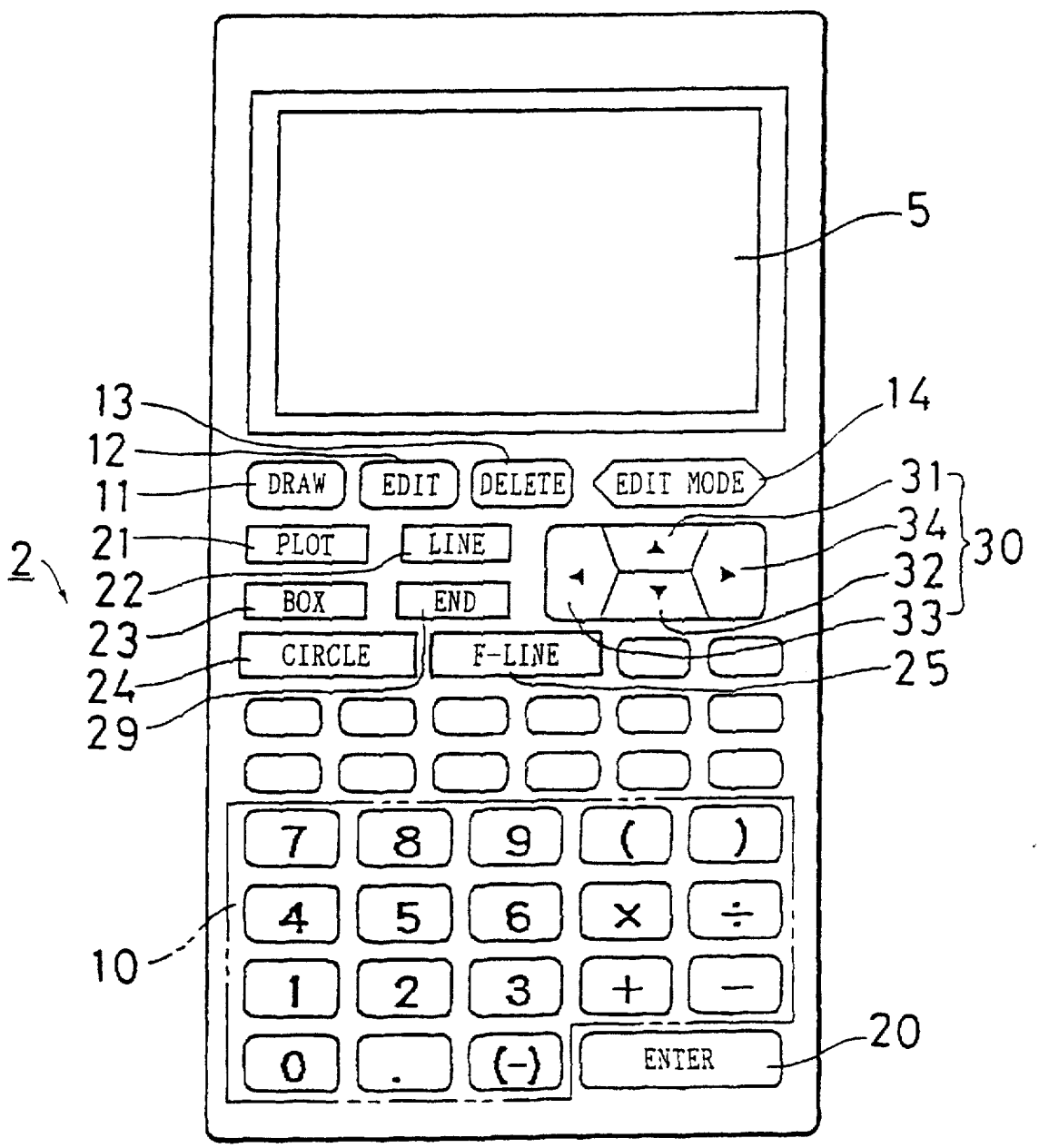
FIG. 2 is a front view showing the appearance of the graphic drawing apparatus of FIG. 1.

FIG. 1 shows a schematic electric configuration of the graphic drawing apparatus according to an embodiment of the present invention, and FIG. 2 is a view showing the configuration of its appearance. A CPU 1 operates according to input by an operator through a keyboard 2. The CPU 1 operates as graphic selecting means, drawing means, editing means, etc., according to programs preset in a program ROM 3. Bit images of figures and graphs, once stored in a display RAM 4, are displayed on a display device 5. The displayed contents are stored in a screen storage area 8 which is the screen storage means in a storage area 7 of a data storage RAM memory 6. A graphic information storage area 9 functioning as the graphic information storage means is also provided in the storage area 7, wherein are registered and stored the forms, the parameters and the rectangular regions representing the graphic drawing regions of the respective drawn graphics. The display device 5 is realized with, for example, liquid crystal display (LCD) elements, and cannot always have a sufficient display area in the case of miniature graphic electronic calculators and the like. Not all the graphics stored in the graphic information storage area 9 are within the range of display on the display device 5.

Figures and function programs for displaying graphs are inputted through the keyboard 2. The keyboard 2 comprises keys for inputting data, including character keys 10 for displaying numerals 0–9 and other symbols or the like, function specifying keys which include a DRAW key 11, an EDIT key 12, a DELETE key 13 and an EDIT MODE key 14, etc. The keyboard 2 further comprises graphic keys related to drawing, including an ENTER key 20, a PLOT key 21, a LINE key 22, a BOX key 23, a CIRCLE key 24, an F-LINE key 25, and an END key 29. Cursor-control keys 30 comprising cursor move keys such as an up arrow key 31, a down arrow key 32, a left arrow key 33 and a right arrow key 34, etc. are also included in the keyboard 2.

Figure 3A:
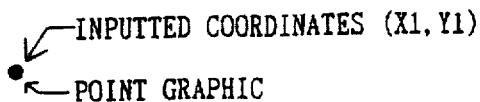
FIGS. 3A–3E are schematic diagrams which show how the rectangular region, that is, the graphic drawing range, is defined in the embodiment of FIG. 1 for each type of graphic.
Figure 3B:
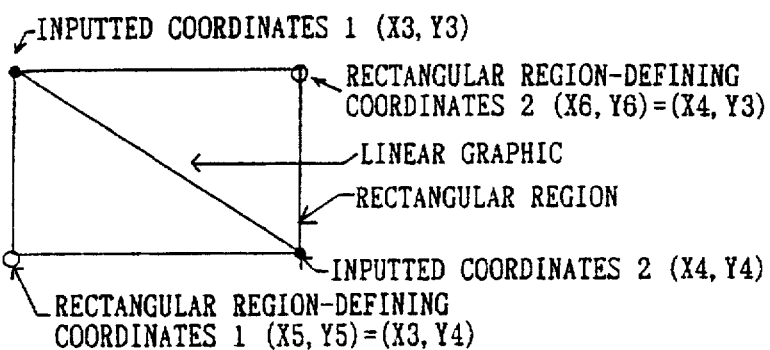
Figure 3C:
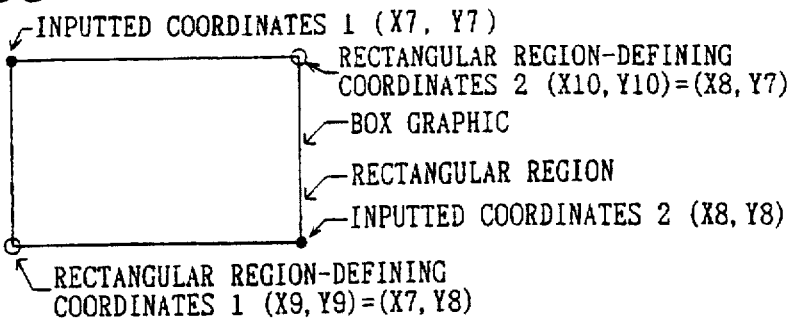
Figure 3D:
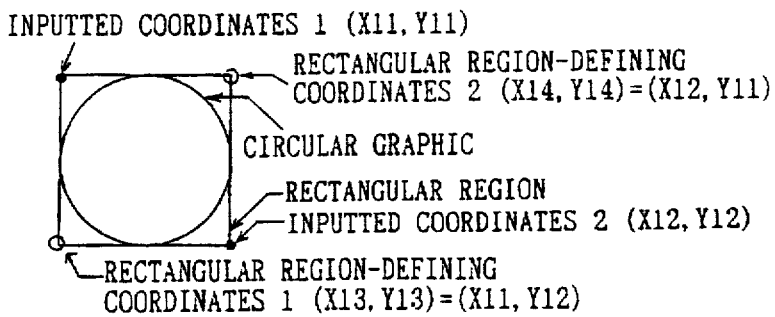
Figure 3E:
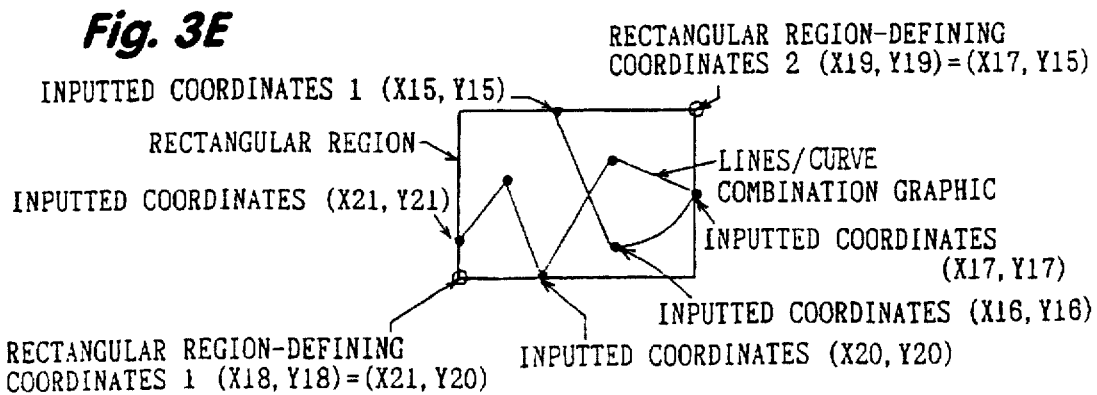

Each of FIGS. 3A–3E is a view illustrative of the method of defining a rectangular region in the graphic information storage area 9 shown in FIG. 1. FIG. 3A illustrates the case of a point graphic referred to as "Plot", FIG. 3B illustrates the case of a straight line segment graphic referred to as "Line", FIG. 3C illustrates the case of a rectangular graphic referred to as "Box", FIG. 3D illustrates the case of a circular graphic referred to as "Circle", and FIG. 3E illustrates the case of a continuous linear graphic referred to as "F-Line". Each rectangular region is defined by the coordinates of both endpoints of the diagonal joining bottom left and top right vertexes of the rectangle circumscribing each graphic. As to the F-line shown in FIG. 3E, only part of the parameters are shown for more convenience in explanation.

For the point graphic shown in FIG. 3A, inputted coordinates (X1, Y1) define the rectangular region. For the straight line segment graphic shown in FIG. 3B, the parameters are the coordinates (X3, Y3) and (X4, Y4) of both endpoints of the line segment, from which the coordinates (X5, Y5) and (X6, Y6) which define the rectangular region are calculated. For the rectangular region graphic shown in FIG. 3C, the coordinates (X7, Y7) and (X8, Y8) of both endpoints of the diagonal are inputted as the parameters, and the rectangular region is defined by the coordinates (X9, Y9) and (X10, Y10) which are determined based on these coordinates. For the circular graphic shown in FIG. 3D, the coordinates (X11, Y11) and (X12, Y12) of the two endpoints of a diagonal of the square inscribed by the circle are inputted as the parameters, and the rectangular region is defined by the coordinates (X13, Y13) and (X14, Y14) which are determined based on these coordinates. For the graphic shown in FIG. 3E which is a combination of lines and a curve, the parameters involve the coordinates (X15, Y15), (X16, Y16), (X17, Y17), etc. inputted for the respective points. The X coordinates of these coordinates are compared to obtain a maximum x coordinate X17 and a minimum Y coordinate X21. In the similar manner a maximum Y coordinate and a minimum Y coordinate are obtained. Then the rectangular region is established as a tetragon defined by a diagonal with endpoints at the coordinates (X18, Y18) and (X19, Y19) which are determined by the combinations of the maximum X coordinate and maximum Y coordinate and the minimum X coordinate and minimum Y coordinate.

Figure 4A:
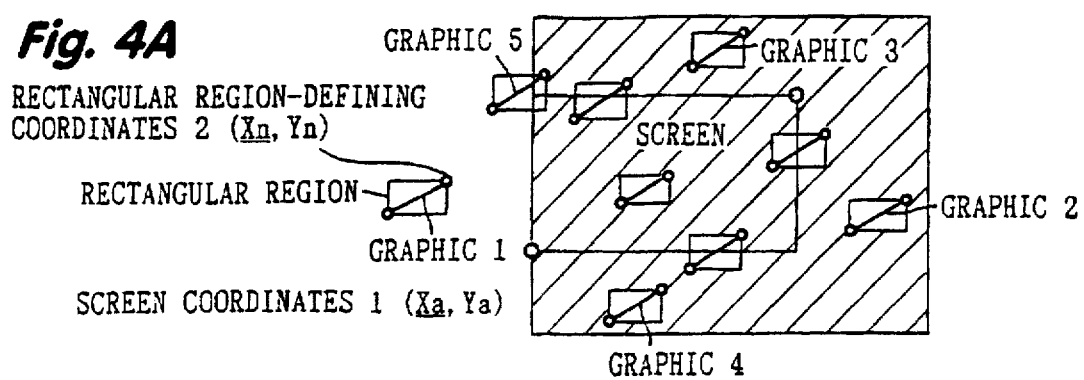
FIGS. 4A–4D are schematic diagrams illustrative of the method of selecting graphics to be displayed on the screen by comparison between the region to be displayed on the screen and each of the rectangular regions in the embodiment of FIG. 1.

FIG. 4A through 4D illustrate guidelines for comparison between the region to be displayed on the screen and the rectangular region for each graphic, which is necessary for high-speed graphic drawing. In FIG. 4A, comparison is made between the X coordinate Xa of the bottom left endpoint of the diagonal which defines the region to be displayed on the screen and the X coordinate Xn of the top right vertex of the rectangular region. In the case where Xn<Xa, the rectangular region is not displayed because it lies outside the region to be displayed on the screen. For example, the line segment designated as Graphic 1 in FIG. 4A is not displayed. Under this condition, the diagonally shaded area is left for display.

Figure 4B:
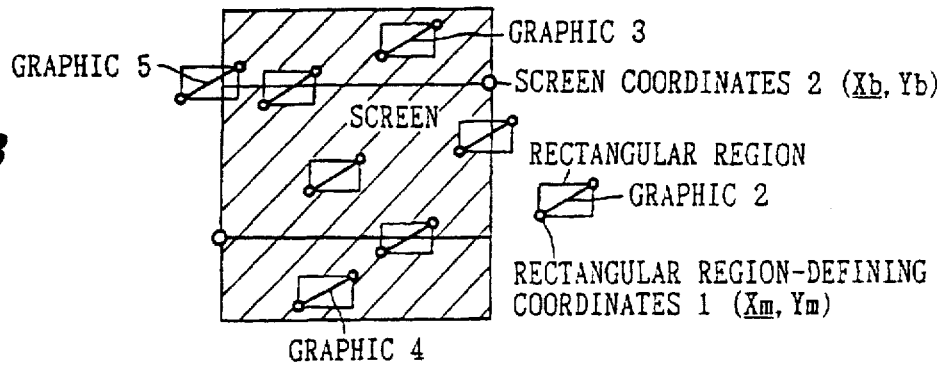

In FIG. 4B, comparison is made between the X coordinate Xb of the top right vertex of the region to be displayed on the screen and the X coordinate Xm of the bottom left vertex of the rectangular region, and, if Xm>Xb, then the rectangular region is judged to be outside the region to be displayed on the screen, namely the graphic is judged not to exist within the region to be displayed on the screen and graphic is not displayed. As an example, the straight line segment designated as Graphic 2 is not displayed since it is located outside the region to be displayed on the screen. As the result of the comparison, only the diagonally shaded area is left for display.

Figure 4C:
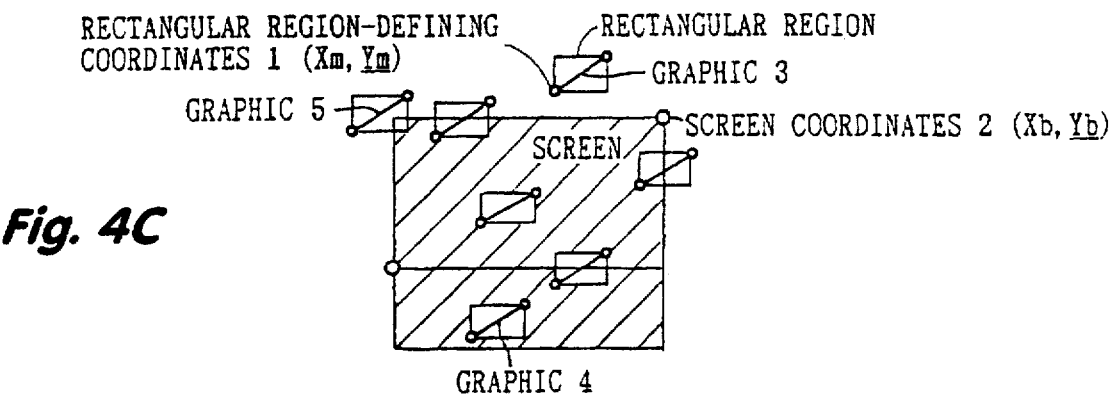

In FIG. 4C, comparison is made between the Y coordinate Yb of the top right vertex of the region to be displayed on the screen and the Y coordinate Ym of the bottom left vertex of the rectangular region. In the case where Ym>Yb, the rectangular region is determined to be outside the region to be displayed on the screen, and thus the related graphic is not displayed. For example, Graphic 3, being outside the region to be displayed on the screen, is not displayed. As the results of the foregoing comparison processing, is left only the diagonally shaded area for display.

Figure 4D:
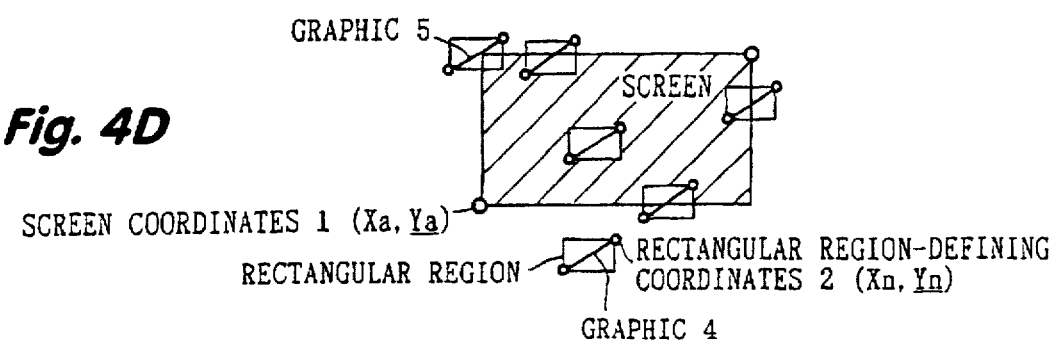

In FIG. 4D, comparison is made between the Y coordinate Ya of the bottom left vertex of the region to be displayed on the screen and the Y coordinate Yn of the top right vertex of the rectangular region. In the case where Yn<Ya, the tetragonal region is determined to be outside the region to be displayed on the screen, and thus the related graphic is not displayed. For example, line segment designated as Graphic 4 is not displayed because the rectangular region lies outside the region to be displayed on the screen. Under these conditions, only the diagonally shaded area is determined to exist within the region to be displayed on the screen. The foregoing processing, however, involves drawing of, for example, Graphic 5 representing a straight line segment which is not actually located in the region to be displayed on the screen, but only its rectangular region is partially within the region to be displayed on the screen; nonetheless, the aforementioned procedures allow more rapid processing than the procedures which include bit-by-bit determination of whether Graphic 5 is to be displayed, and display only the parts thereof which are present in the region to be displayed on the screen.

Figure 5:
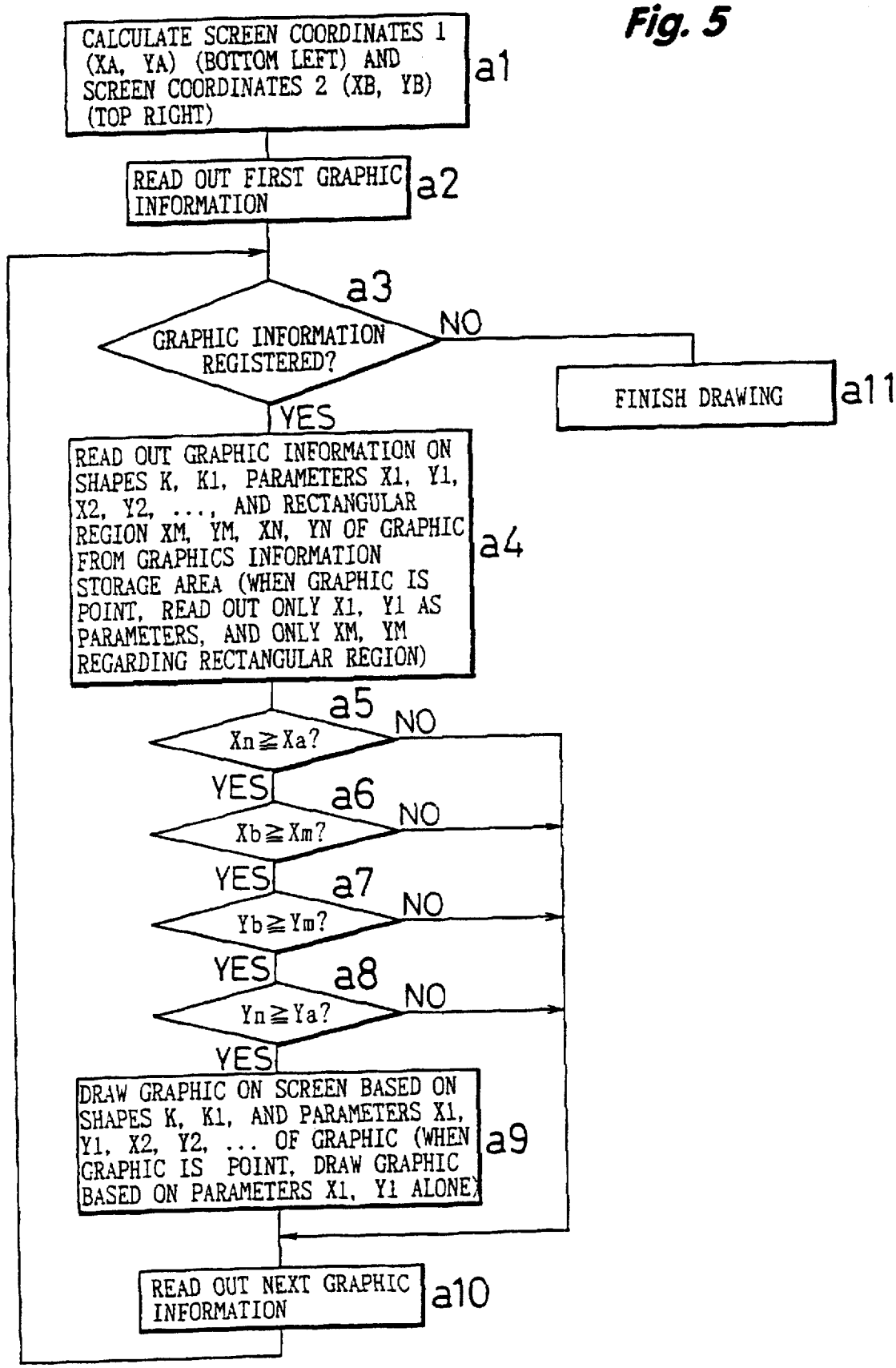
FIG. 5 is a flow chart illustrative of the operation shown in FIG. 4.

FIG. 5 illustrates an algorithm for graphic drawing processing of a plurality of graphics stored in the graphic information storage area 9. In step a1, the screen coordinates (Xa, Ya) and (Xb, Yb) are determined by calculation. In step a2, first graphic information is read out. In step a3, it is judged whether the graphic information is registered. The registered graphic information includes a certain easy-to-identify code at its end, which serves to determine the end of the information. In step a4, graphic information of the shapes K, K1, parameters X1, Y1, X2, Y2, . . . , and the rectangular-region-defining coordinates (Xm, Ym), (Xn, Yn) of the graphic is read out from the graphics information storage area 9. In the case where the graphic is a point, only X1 and Y1 are read out as the parameters, and only Xm and Ym are read out with respect to the rectangular region.

In step a5, it is judged whether Xn is Xa or larger. In the case where Xn is Xa or larger, the process goes to step a6 where it is judged whether Xb is Xm or larger. If yes, the process goes to step a7 where it is judged whether Yb is Ym or larger. If yes, the process goes to step a8 where it is judged whether Yn is Ya or larger. If yes, the process goes to step a9 where the graphic is drawn on the screen on the basis of the shapes K and K1, and the parameters X1, Y1, X2, Y2, . . . of the graphic. In the case where the graphic is a-point, the graphic is drawn based on the parameters X1 and Y1 alone. After finishing step a9, or in the case where either of the conditions specified in steps a5 through a8 is not met, the process goes to step a10 where the next graphic information is read out and the process returns to step a3. In the case where no graphic information is registered yet in step a3, the graphic drawing is finished in step a11.

Figure 6:
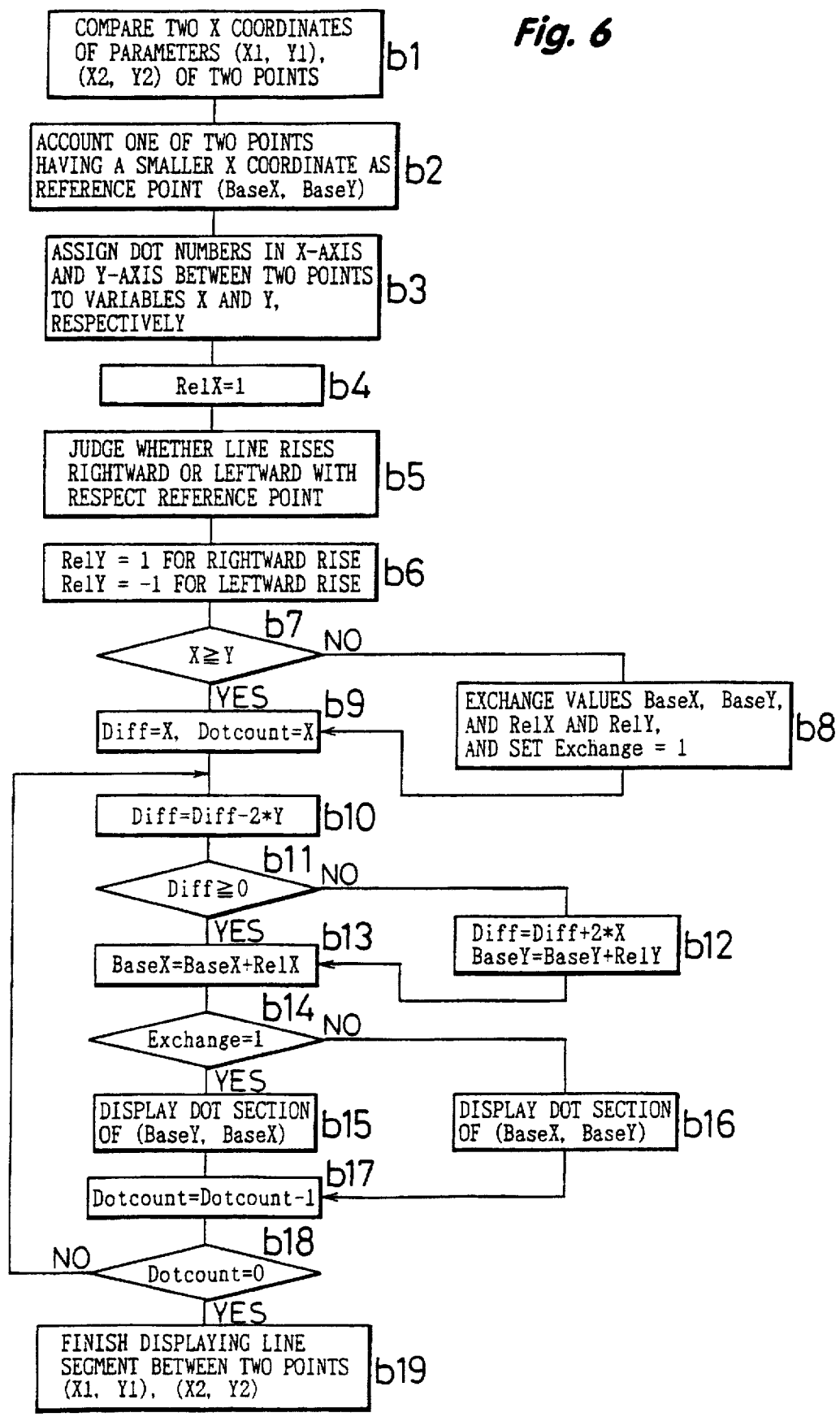
FIG. 6 is a flow chart illustrative of an algorithm for drawing a straight line segment.

FIG. 6 illustrates an algorithm for the drawing of a straight line segment in the drawing processing in step a9 shown in FIG. 5. First, in step b1, comparison is made between the two X coordinates, X1 and X2, extracted from the parameters (X1, Y1) of the first inputted point and the parameters (X2, Y2) of the later inputted point. In step b2, one point of the two which has a smaller X coordinate is set as the reference point (BaseX, BaseY). In step b3, the dot numbers along the X-axis and the Y-axis between the two points are assigned to the variables X and Y, respectively. In step b4, the values of a variable Re1X is set at 1. In step b5, it is judged whether the straight line rises rightward or leftward with respect to the reference point. In step b6, the variable Rely is set at 1 for a rightward rise and at −1 for a leftward rise. In step b7, comparison is made between the dot number X along the X direction and the dot number Y along the Y direction, and unless $X \geq Y$, in step b8, changing of values is made between X and Y, BaseX and BaseY, and Re1X and Re1Y, followed by setting of a variable Exchange at 1. This changing is made, for example, in the case where, when the line segment joining the points (BaseX, BaseY) and (X2,Y2) is being drawn, the dot number along the Y-axis between the two points is larger than that along the X-axis, so that the dot number along the X-axis becomes larger than that along the Y-axis to allow the use of the same calculation process by substituting the points (BaseY, BaseX) and (Y2, X2) for the original points. The drawing process changes depending on the value of the variable Exchange. After finishing step b8, or in the case where $X \geq Y$ is met in step b7, X is assigned to a variable Diff and further to a variable Dotcount in step b9. In step b10, twice the value of the variable Y is subtracted from the value of the variable Diff. In step b11, it is judged whether $Diff \geq 0$. In the case where Diff<0, the process goes to step b12 where twice the value of the variable X is added to the value of the variable Diff, while the value of the variable Re1Y is added to the value of the variable BaseY. In the case where it is judged in step b11 that Diff=>0, or after the process in step b12 is finished, the process goes to step b13 where the value of the variable Re1X is added to the value of the variable BaseX.

In step b14, it is judged whether the value of the variable Exchange is 1. In the case where the value is 1, the dot section of (BaseY, BaseX) is displayed in step b15. In the case where it is judged in step b14 that the value of the variable Exchange is not 1, the dot section of (BaseX, BaseY) is displayed in step b16. After step b15 or step b16 is finished, the value of the variable Dotcount is reduced by 1 in step b17, and it is judged in step b18 whether the value of the variable Dotcount is 0. In the case where this value is not 0, the process returns to step b10; otherwise, that is, in the case where the value is 0, display of the straight line segment between the two points (X1, Y1) and (X2, Y2) is finished in step b19.

In addition, another method of drawing graphics includes display of the dot section of the coordinates as the parameters in the case where the graphic is a point. In the case where the graphic is a rectangle, the coordinates of the four vertexes of the rectangle are determined based on the parameters, and respective straight line segments joining the two horizontal points and the two vertical points are drawn following the algorithm as illustrated in FIG. 6.

In the case where the graphic is a circle, first, the following equations of the circle inscribing a rectangle with the diagonal defined by the two coordinates as the parameters are solved.

$X = R1 \cdot \cos T + S1$ $Y = R2 \cdot \sin T + S2$ wherein the values of R1 and R2 are given as R1=|X2−X1|/2 and R2=|Y2−Y1|/2, respectively, the values of S1 and S2 determines the center of the circle, where S1=(X2+X1)/2, and S2=(Y2+Y1)/2. In addition, the value of T varies between 0 and 360 degrees. The value of T may be changed at a desired rate, and the values of X and Y corresponding to the established value of T are calculated according to the equations defining the circle. A line segment, which joins the point with the calculated X and Y coordinates and the point with the X and Y coordinates which are calculated based on a second changed value of T, is drawn in the same manner as illustrated in FIG. 6. Elliptical graphics may be drawn in the same manner as circular graphics. A continuous linear graphic F-Line, which is a combination of straight line segments and arcs, may also be drawn similarly.

Figure 7:
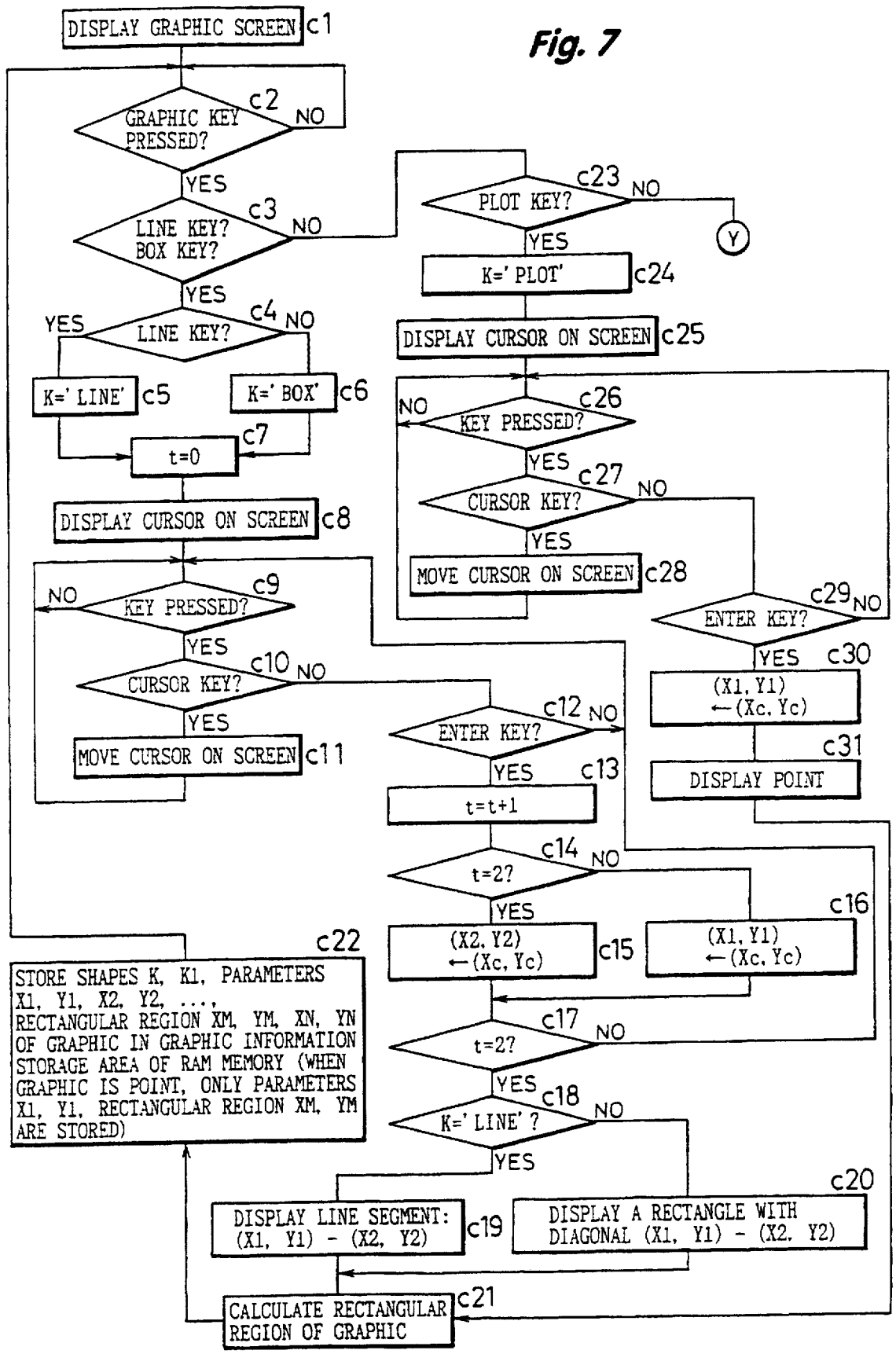
FIGS. 7–9 are a flow chart illustrative of an algorithm for inputting graphics on the graphic screen.
Figure 8:
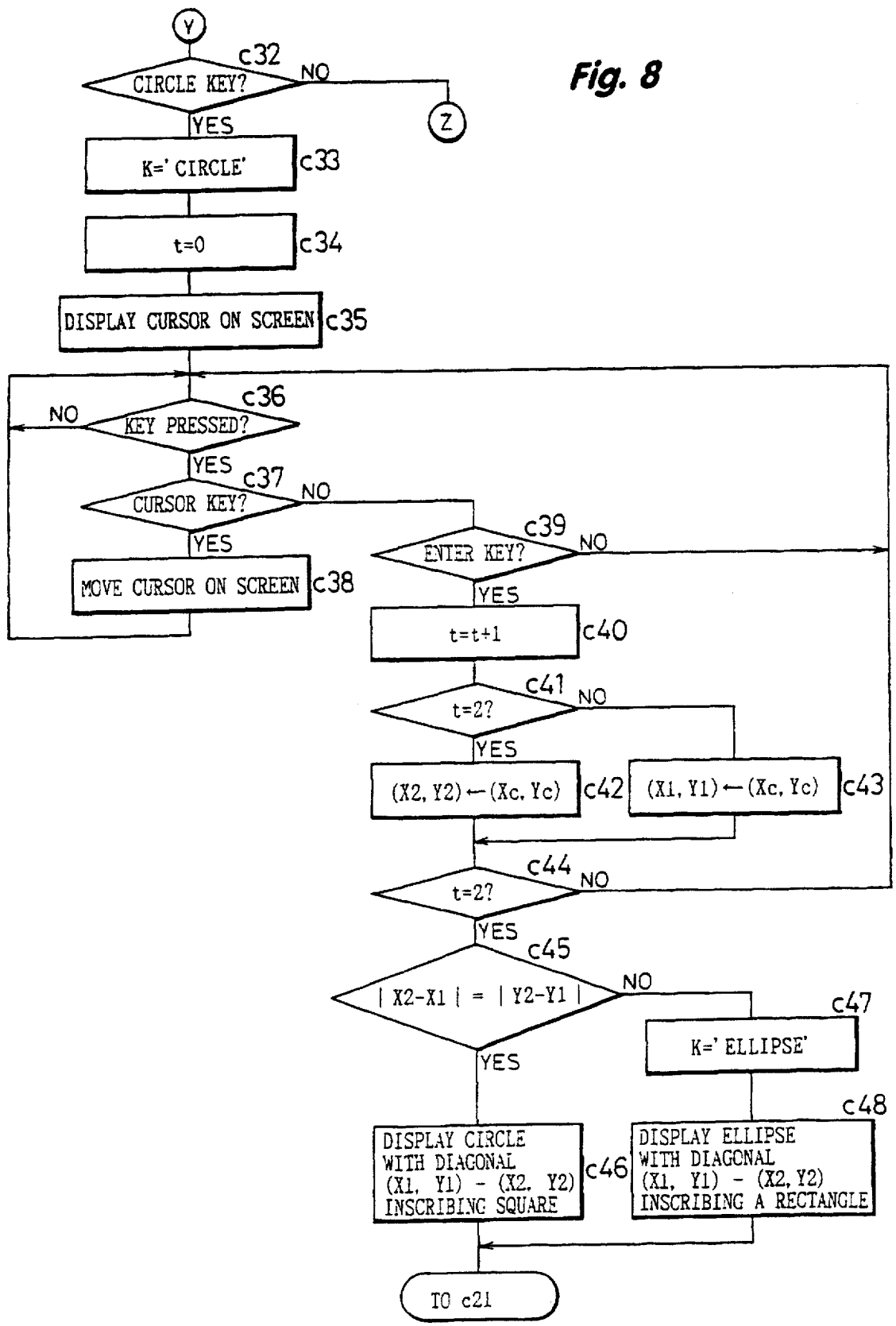
Figure 9:
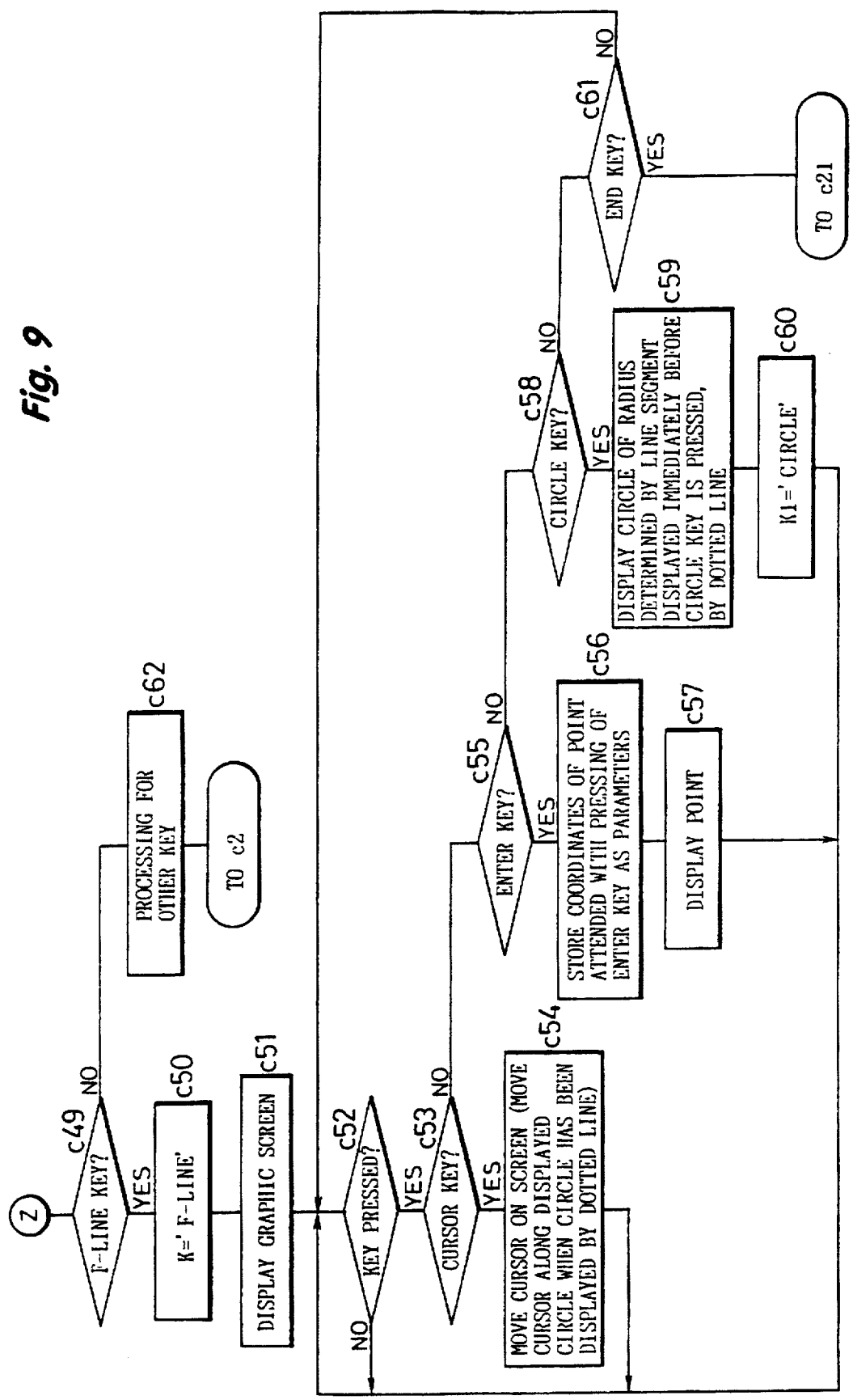

FIG. 7 through FIG. 9 illustrate algorithms for inputting graphics on the graphic screen. The graphic screen is displayed in step c1, and it is judged in step c2 whether inputting has been made with a graphic key. In the case where inputting has been made, it is judged in step c3 whether the pressed key is the Line key 22 or the Box key 23. In the case where inputting has been made from either of the two keys, the process goes to step c4 where it is judged whether the inputting has been made with the Line key 22. If yes, a character sequence "Line" is assigned to a variable K in step c5, whereas another character sequence "Box" is assigned to the variable K in step c6 if the condition is not met. In step c7, 0 is assigned to a variable t which is a counter for determination of the starting point or the endpoint. In step c8, the cursor 40 as will be mentioned later is displayed on the screen, and the process pauses for keying in step c9.

In the case where it is judged in step c10 that one of the cursor keys 30 has been pressed, the process goes to step c11 where the cursor on the screen is moved. In the case where it is judged in step c10 that a key other than the cursor keys has been pressed, the process goes to step c12 where it is judged whether the ENTER key 20 has been pressed. In the case where the ENTER key 20 is judged to have been pressed, the value of the variable t is increased by 1 in step c13, and it is judged in step c14 whether the value of the variable t is 2. If yes, the coordinates (Xc, Yc) of the cursor are assigned to the values of the second parameters (X2, Y2) in Step c15. In the case where the condition is not met, the coordinates (Xc, Yc) of the cursor are assigned to the values of the first parameters (X1, Y1) in step c16. It is again judged in step c17 whether the value of the variable t is 2. If yes, it is judged in step c18 whether the variable K is equal to the character sequence "Line", and a line segment joining the points (X1, Y1) and (X2, Y2) is displayed in step c19 in the case where they are identical. In the case where they are judged not to be identical in step c18, a rectangle with the diagonal joining the points (X1, Y1) and (X2, Y2) is displayed in step c20. After step c19 or step c20 is finished, the process goes to step c21 where a rectangular region which is the graphic drawing range of the graphic is calculated according to the manner illustrated in FIG. 3. Then, in step c22, the shapes K and K1, the parameters X1, Y1, X2, Y2, . . . , and the rectangular-region-defining coordinates (Xm, Ym), (Xn, Yn) of the graphic are stored in the graphic information storage area 9 of the data storage RAM memory 6. In the case where the graphic is a point, however, only the parameters X1 and Y1 and the rectangular-region-defining coordinates (Xm, Ym) are stored.

In the case where the condition is not met in step c3, the process goes to step c23 where it is judged whether the graphic key pressed is the Plot key 21. If yes, the process goes to step c24 where the character sequence "Plot" is assigned to the variable K. Then, in step c25, the cursor is displayed on the screen of the display device 5, and the process pauses for keying in step c26. When a key is pressed, the process goes to step c27 where it is judged whether the pressed key is one of the cursor keys 30. In the case where the pressed key is one of the cursor keys 30, the cursor on the screen is moved in step c28. In the case where none of the cursor keys 30 is judged to have been pressed, the process goes to step c29 where it is judged whether the pressed key is the ENTER key 20. If yes, the process goes to step c30 where the coordinates (Xc, Yc) of the cursor are assigned to the parameters (X1, Y1). Then, in step c31, a point is displayed at the location of the cursor, and the process goes to step c21. In the case where no key is pressed in step c26, the process in step c28 is finished, or the ENTER key 20 is not pressed in step c29, the process returns to step c26. In the case where it is judged in step c23 hat a key other than the Plot key 21 has been pressed, the process goes to step c32 shown in FIG. 8.

In step c32, it is judged whether the pressed key is the Circle key 24. If yes, the process goes to step c33 where the character sequence "Circle" is assigned to the variable K. In step c34, 0 is assigned to the counter t. Then, in step c35, the cursor is displayed on the screen, and the process pauses for keying in step c36. When a key is pressed, the process goes to step c37 where it is judged whether the pressed key is one of the cursor keys 30. In the case where one of the cursor keys 30 is judged to have been pressed, the cursor on the screen is moved in step c38. In the case where it is judged in step c37 that none of the cursor keys 30 has been pressed, the process goes to step c39 where it is judged whether the pressed key is the ENTER key 20. The process returns to step c36 after step c38 is finished or in the case where it is judged in step c39 that the pressed key is not the ENTER key 20.

In the case where it is judged in step c39 that the pressed key is the ENTER key 20, the process goes to step c40 where the value of the variable t is increased by 1. In step c41, it is judged whether the value of the variable t has reached 2. In the case where the value of the variable t has reached 2, the coordinates (Xc, Yc) of the cursor are assigned to (X2, Y2). In the case where value of the variable t is judged not to be 2, the value of the variable t is 1, and the coordinates (Xc, Yc) of the cursor are assigned to (X1, Y1) in step c43. After step c42 or step c43 has been finished, it is judged in step c44 whether the value of the variable t is 2. In the case where the value of the variable t is not 2, that is, the value of the variable t is 1, the process returns to step c36.

In the case where the value of the variable t is 2 in step c44, it is judged in step c45 whether the absolute value |X2−X1| of the difference of the X coordinates is identical to the absolute value |Y2−Y1| of the difference of the Y coordinates. In the case where they are identical, a circle is displayed in step c46 which inscribes a square with a diagonal joining the vertexes (X1, Y1) and (X2, Y2). In the case where it is judged in step c45 that they are not identical, the process goes to step c47 where the character sequence "Ellipse" is assigned to the variable K, and an ellipse which inscribes the rectangle with a diagonal joining the vertexes (X1, Y1) and (X2, Y2) is displayed in step c48. After the process in step c46 or step c48 has been finished, the process returns to step c21 shown in FIG. 7.

In the case where it is judged in step c32 that the pressed key is not the Circle key 24, the process goes to step c49 illustrated in FIG. 9. It is judged in step c49 illustrated in FIG. 9 whether the pressed key is the F-Line key 25. If yes, the process goes to step c50 where the character sequence "F-Line" is assigned to the variable K. Then, in step c51, the cursor is displayed on the screen, and the process pauses for keying in step c52. In the case where a key is pressed, the process goes to step c53 where it is judged whether the pressed key is one of the cursor keys 30. In the case where one of the cursor keys 30 is judged to have been pressed, the process goes to step c54 where the cursor on the screen is moved. However, the cursor is moved along the displayed circle in the case where a circle has already been displayed by a dotted line. In the case where it is judged in step c53 that a key other than the cursor keys 30 has been pressed, the process goes to step c55 where it is judged whether the ENTER key 20 has been pressed. In the case where the ENTER key is judged to have been pressed, the process goes to step c56 where the coordinates of the point at which the ENTER key 20 has been pressed are stored as parameters. The corresponding point is then displayed in step c57.

In the case where it is judged in step c55 that a key other than the ENTER key 20 has been pressed, the process goes to step c58 where it is judged whether the CIRCLE key 24 has been pressed. If yes, the process goes to step c59 where a circle of radius which is determined by the line segment displayed immediately before the CIRCLE key 24 is pressed down, is displayed by a dotted line. The character sequence "CIRCLE" is assigned to the variable K1 in step c60. In the case where it is judged in step c58 that the CIRCLE key 24 has not been pressed, the process goes to step c61 where it is Judged whether the END key 29 has been pressed. In the case where the END key 29 is judged to have been pressed, the process goes back to step c21 illustrated in FIG. 7. The process returns to step c52 in the case where no key is pressed in step c52, or after each process in step c54, step c57 or step c60 has been finished, or in the case where it is judged in step c61 that the pressed key is not the END key 29. In the case where it is judged in step c49 that the pressed key is not the F-Line key 25, the process goes to step c62 where the other key is processed. In the case where the processing of the other key is finished in step c62, the process returns to step c2 illustrated in FIG. 7.

Figure 10A:
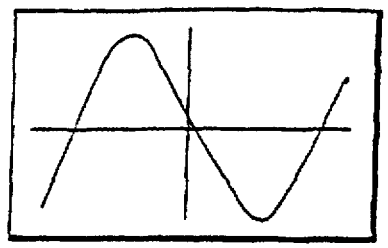
FIGS. 10A–10D are schematic diagrams illustrative of the method of inputting a plot graphic on the graphic screen.
Figure 10B:
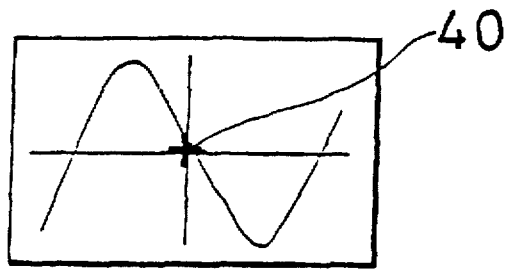
Figure 10C:
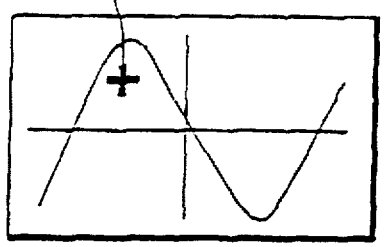
Figure 10D:
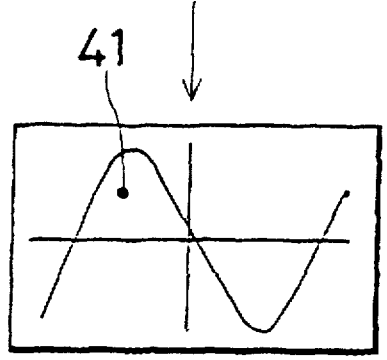

FIGS. 10A–10D illustrate how a point graphic is inputted on the graphic screen. In FIG. 10A, the Plot key 21 is pressed while a graph is displayed on the screen. This pressing results in display of a cursor 40 blinking almost in the center of the screen, as illustrated in FIG. 10B. By pressing the left arrow key 33 three times and the up arrow key 31 three times, the cursor 40 moves to the location illustrated in FIG. 10C. Then, upon pressing of the ENTER key 20, a point 41 is displayed at the location of the cursor 40 in FIG. 10C, as illustrated in FIG. 10D.

Figure 11A:
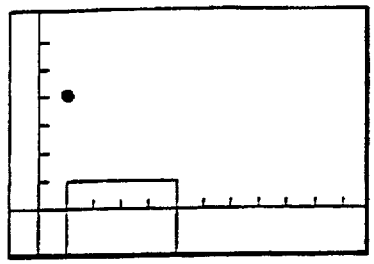
FIGS. 11A–11F are schematic diagrams illustrative of the method of inputting a rectangular graphic on the graphic screen.
Figure 11B:
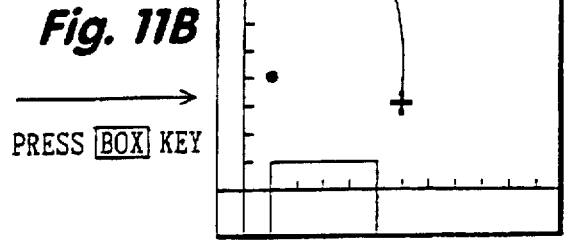
Figure 11C:
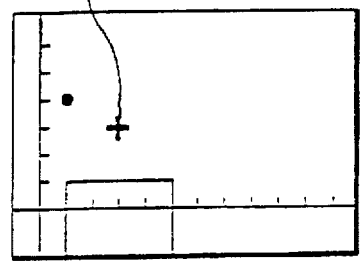
Figure 11D:
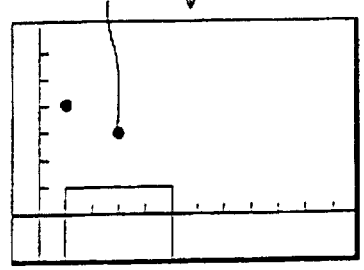
Figure 11F:
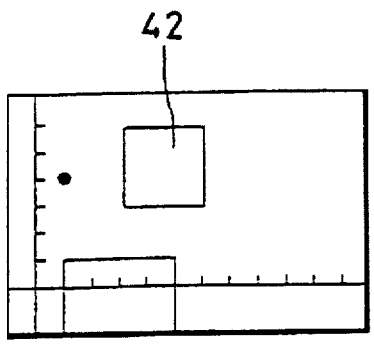
Figure 11E:
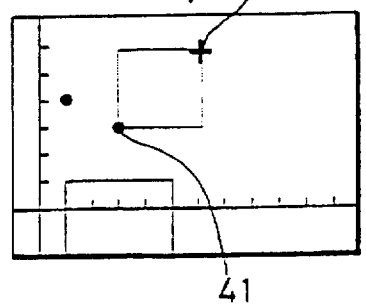

FIGS. 11A–11F illustrate how a tetragonal graphic is inputted. In the case where the Box key 23 is pressed while such graphic representation as illustrated in FIG. 11A is displayed on the screen, the display changes to the state illustrated in FIG. 11B wherein the blinking cursor 40 is displayed almost in the center of the screen. When the left arrow key 33 is pressed three times, the cursor 40 moves to the location illustrated in FIG. 11C. In the case where the ENTER key 20 is pressed in this state, the point 41 is displayed blinking at the location of the cursor 40 in FIG. 11C, as illustrated in FIG. 11D. Then, by pressing the up arrow key 31 three times and the right arrow key 34 three times, the cursor 40 moves to the location illustrated in FIG. 11E, and a tetragon (a square in this case) with a diagonal which is the line segment between the location of the blinking cursor 41 at the time when the ENTER key 20 had been pressed and the location of the cursor 40, is displayed by dotted lines. The shape of the tetragon changes as the cursor 40 moves. Upon pressing the ENTER key 20, a tetragon 42 is displayed as illustrated in FIG. 11F.

Figure 12A:
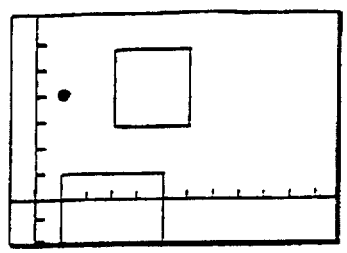
FIGS. 12A–12G are schematic diagrams illustrative of the method of inputting a circular or elliptical graphic on the graphic screen.
Figure 12B:
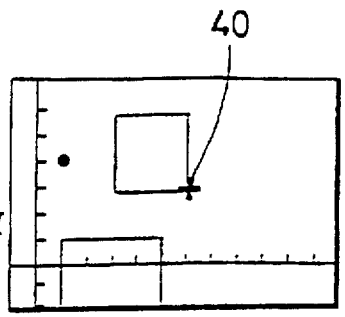
Figure 12C:
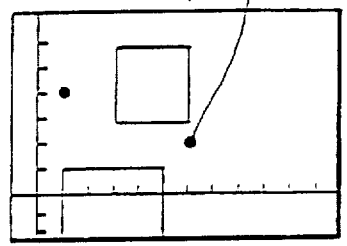
Figure 12E:
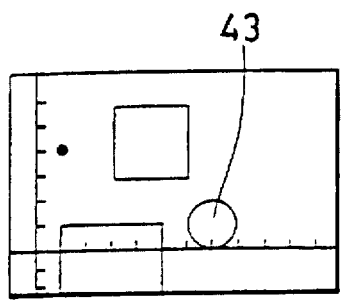
Figure 12D:
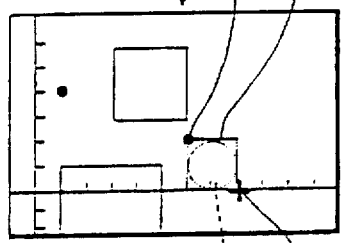
Figure 12G:
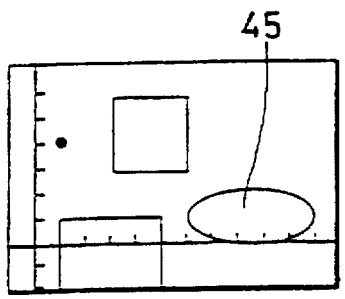
Figure 12F:
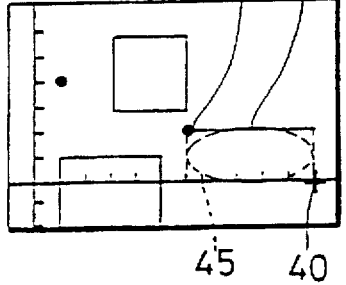

FIGS. 12A–12G illustrate how a circle and an ellipse are inputted as graphics on the graphic screen. For convenience, explanation will be started from the state illustrated in FIG. 11F, namely FIG. 12A. When the Circle key 24 is pressed in the state illustrated in FIG. 11F, namely FIG. 12A, the cursor 40 is displayed blinking almost in the center of the screen, as illustrated in FIG. 12B. Upon pressing the down arrow key 32 and the ENTER key 20, the cursor 40 in FIG. 12B moves to the location illustrated In FIG. 12C to display a point 41. When the down arrow key 32 and the right arrow key 34 are each pressed twice, the cursor 40 moves to the location illustrated in FIG. 12D; a tetragon 42 constructed with a diagonal joining the location of the cursor 40 after its movement and the point 41 is a square which is inscribed by a circle 43 displayed by a dotted line. Upon pressing of the ENTER key 20 in this state, the representation of the circle 43 is switched to a solid line, as illustrated in FIG. 12E. When the right arrow key 34 is pressed three times in the state shown in FIG. 12D, the cursor 40 moves to the location illustrated in FIG. 12F, wherein there is displayed a dotted-line-represented ellipse 45 which inscribes a rectangle 44 defined by a diagonal joining the location of the cursor 40 and the point 41, and the representation of the ellipse 45 is switched to a solid line upon pressing the ENTER key 20, as illustrated in FIG. 12G.

FIG. 13 illustrate the graphic input state of the F-Line mode for inputting a continuous line on the graphic screen. For convenience, explanation will be started from the state illustrated in FIG. 12G, namely in FIG. 13A. When the F-Line key 25 is pressed in the state illustrated in FIG. 12G, namely FIG. 13A, the cursor 40 is displayed blinking almost in the Center of the screen, as illustrated in FIG. 13B. By pressing the ENTER key 20 once, the right arrow key 34 twice and the up arrow key 31 once in this state, a point 41 is displayed blinking at the location of the cursor 40 in FIG. 13B, as illustrated in FIG. 13C, and the cursor 40 moves to a top right-hand location and blinks there. A straight line segment 50 is displayed as a dotted line between the cursor 40 and the point 41. Upon pressing the ENTER key 20, the point 41 at the location of the cursor 40 in FIG. 13C starts to blink, as illustrated in FIG. 13D. When the down arrow key 32 is pressed three times, the right arrow key 34 is pressed once and the ENTER key 20 is pressed once, the cursor moves to a bottom right-hand location and a point 41 is displayed blinking at that location. A straight line segment 51 is displayed as a dotted line between the rear endpoint of the straight line segment 50 and the point 41. Upon pressing the Circle key 24, there is displaced a dotted-line-represented circle 52 of radius which is defined by the line segment 51, as illustrated in FIG. 13F. Then, when the up arrow key 31 of the cursor keys 30 is pressed three times, the cursor moves upward along the circumference of the circle 52.

Figure 13A:
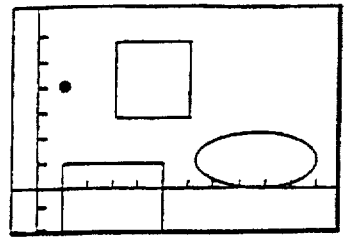
FIGS. 13A–13K are schematic diagrams illustrative of the method of inputting a continuous line on the graphic screen.
Figure 13B:
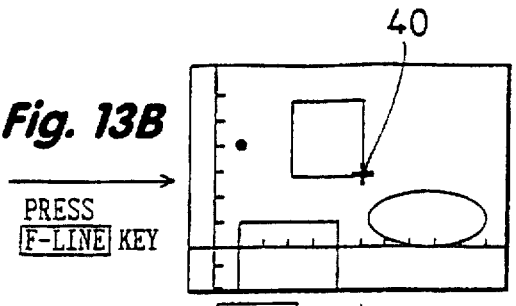
Figure 13D:
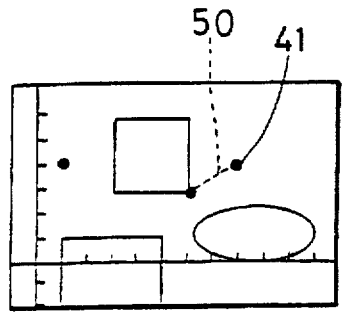
Figure 13C:
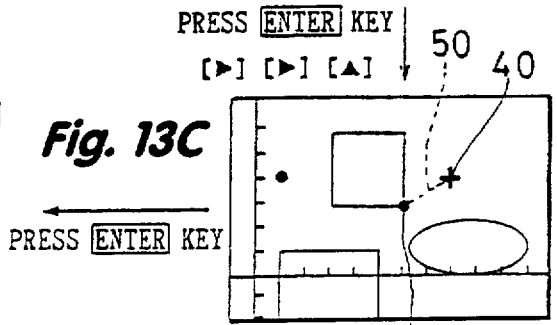
Figure 13E:
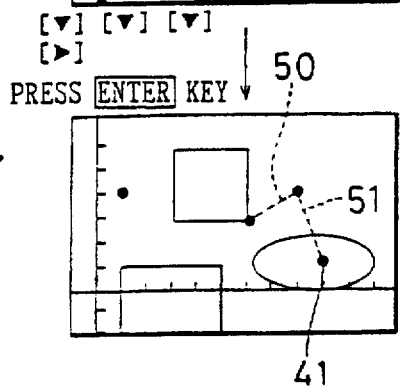
Figure 13F:
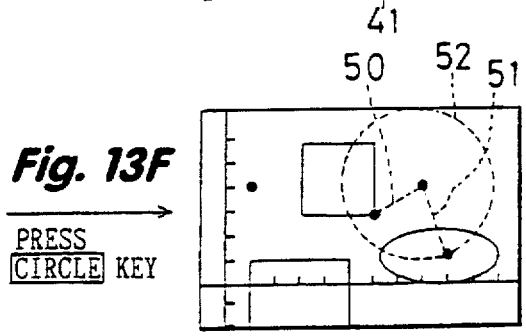
Figure 13G:
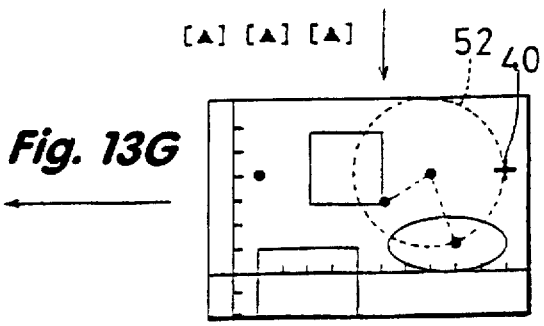
Figure 13H:
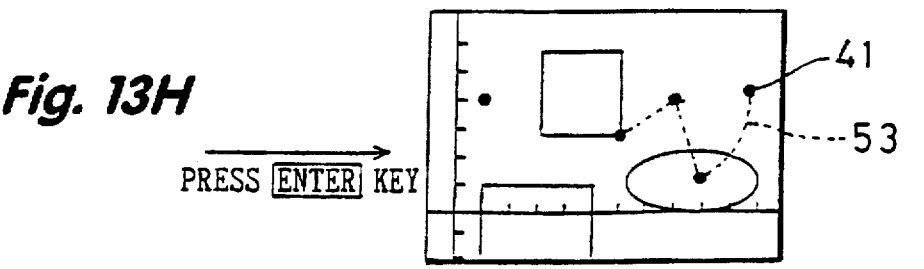
Figure 13I:
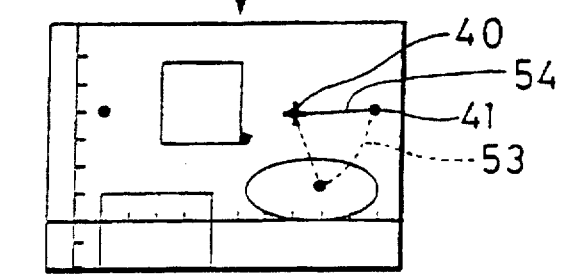
Figure 13J:
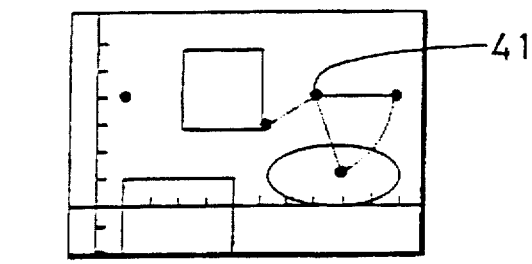
Figure 13K:
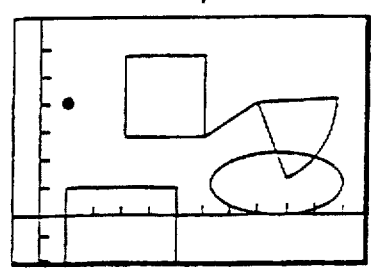

Pressing the ENTER key 20 in this state once, the arc 53 traced by the cursor is represented in a dotted line, and the remaining arc of the circle disappears. In the case where the left arrow key 33 is pressed three times in this state, the cursor 40 moves leftward from the point 41 as illustrated in FIG. 13I, and a dotted-line-represented line segment 54 is displayed between the cursor 40 and the point 41. When the ENTER key 20 is pressed once in this state, the blinking point 41 is displayed at the location of the cursor in FIG. 13I, as illustrated in FIG. 13J. Upon pressing of the End key 29 in this state, the dotted-line-represented graphic in FIG. 14K is entirely switched to a graphic represented in solid line.

FIG. 15 illustrates algorithms for inputting, modifying and deleting graphics on the edit screen. First, the graphic screen is displayed in step d1. In step d2, the process pauses to wait for pressing of the Edit key 14. Upon pressing the EDIT MODE key 14, the process goes to step d3, and the graphic information in the graphic information storage area 9 of the data storage RAM memory 6 is read into the display RAM 4 and displayed on the editing screen. In step d4, the process pauses to wait for pressing of the EDIT key 12; in the case where the EDIT key 12 is not pressed, it is judged in step d5 whether the EDIT MODE key 14 has been pressed again. If not, then the process returns to step d4. In the case where it is judged in step d5 that the EDIT MODE key 14 has been pressed, the process returns to step d1 for display of the graphic screen. In other words, the EDIT MODE key 14 performs toggle operation for alternate switching between the graphic screen and the editing screen.

In the case where it is judged in step d4 that the EDIT key 12 has been pressed, the shape part of the graphic information which is located uppermost on the editing screen is displayed in a reverse manner in step d6. Then, the process goes to step d7 where it is judged whether the DELETE key 13 has been pressed. In the case where the DELETE key 13 has been pressed, the process goes to step d8, and the reverse-blinking graphic information is deleted from the information storage area 9 of the data storage RAM memory 6. In the case where it is judged in step d7 that the pressed key is not the DELETE key 13, the process goes to step d9 where it is judged whether one of character keys 10 has been pressed to input a character to modify the parameters, etc. on the editing screen. In the case where it is judged that a character has been inputted, the process goes to step d10 where calculation is made for the rectangular region of the graphic modified by the inputted character. In the case where it is judged in step d9 that no character has been inputted, it is judged in step d11 whether one of the cursor keys 30 has been pressed. In the case where one of the cursor keys 30 has been pressed, the reverse-blinking section on the editing screen is moved as directed by one of the cursor keys 30 in step d12. In the case where it is judged in step d11 that none of the cursor keys 30 has been pressed, the process goes to step d13 where it is judged whether the EDIT MODE key 14 has been pressed. In the case where it is judged that the EDIT MODE key 14 has not been pressed, the process returns to step d7. After the process in step d8, step d10 or step d12 has been finished, the process goes to step d14 where it is judged whether the END key 29 has been pressed. If no, then the process returns to step d7. In the case where it is judged that the END key 29 has been pressed, the process goes to step d15. The process goes to step d15 also in the case where it is judged in step d13 that the EDIT MODE key 14 has been pressed. In step d15, the shapes K and K1, the parameters X1, Y1, X2, Y2, . . . , and the rectangular-region-defining coordinates (Xm, Ym), (Xn, Yn) of the graphic are stored in the graphic storage area 9 of the data storage RAM memory 6. In the case where the graphic is a point, however, only the parameters X1 and Y1 and the rectangular-region-defining coordinates (Xm, Ym) are stored.

Figure 14:
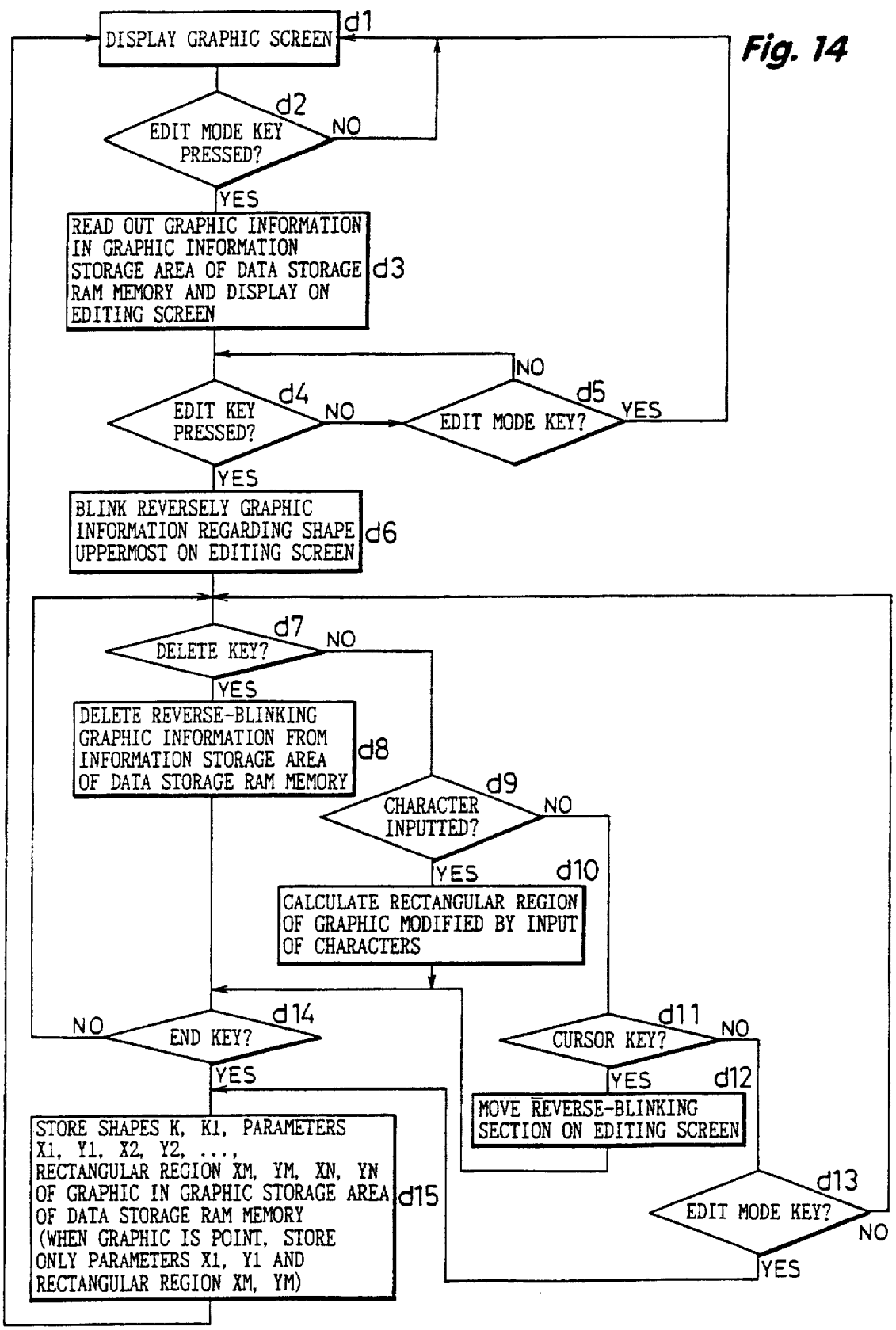
FIG. 14 is a flow chart illustrative of algorithms for inputting, modifying and deleting a graphic on the editing screen.

FIGS. 15A–15F illustrate how the graphic information is edited according to the algorithms illustrated in FIG. 14. The state of FIG. 15A where the graphics as shown in FIG. 15A are drawn is identical to the state of FIG. 13K. An explanation will now be given regarding how a tetragon 42 is erased. Upon pressing the EDIT MODE key 14, there are displayed the "GRAPHIC SHAPES" and the "PARAMETER" extracted from the contents of the graphic information storage area 9, as illustrated in FIG. 15B. The item "DISPLAY" also appears on the screen, in which a circle indicates that the marked graphic is entirely displayed on the screen, a triangle indicates that the marked graphic is partially displayed on the screen, and the X indicates that the marked graphic is not displayed on the screen. That is, the X-marked graphics are ones whose rectangular regions are judged not to be within the region to be displayed on the screen as a result of comparison between the coordinates of the two endpoints of a diagonal of the region to be displayed on the screen and the respective rectangular regions, as illustrated in FIG. 4. For example, the fifth graphic from the top in FIG. 15B, being a straight line segment with two endpoints of coordinates (-2, -2) and (-5, 1), is marked with X in the item "DISPLAY" since it is outside the region to be displayed on the screen.

Upon pressing the EDIT key 12 in FIG. 15B, the information of the first graphic under the item "GRAPHIC SHAPES" is highlighted by reverse blinking, as illustrated in FIG. 15C. For example, when the down arrow key 32 is pressed, the reverse highlight moves to "Box" in the second row in the item "GRAPHIC SHAPES", as illustrated in FIG. 15D. If the DELETE key 13 is pressed in this state, then all the information on the graphic of the shape indicated to be "Box" which is blinking reversely in the item "GRAPHIC SHAPES" in FIG. 15D, is deleted as illustrated in FIG. 15E, and the information on the graphics located thereunder moves up by one row. Then, in the case where the Edit key 14 is pressed in this state, the representation image of the tetragon 42, which is displayed upward on the screen as shown in FIG. 15A, is also erased from the screen, as illustrated in FIG. 15F.

In addition, in the case where the parameters of the respective graphics, for example, a graphic of the shape indicated to be "F-Line", stored in the graphic information storage area 9, are stored in the form of relative coordinates in the rectangular regions, all that is needed to move or copy the graphics is to modify their coordinate values in their rectangular regions, thus obviating the necessity for modifying the parameters.

Although the above embodiment is explained regarding the use of a graphic, function calculator as the graphic drawing apparatus, the present invention may also be carried out with compact electronic equipment which allows graphic representation, including so-called electronic notebooks.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A graphic drawing apparatus which allows drawing of a graphic on a graphic drawing plane and allows displaying of a part of the drawing plane on a screen, the apparatus comprising:

a screen storage memory for storing a region to be displayed on the screen and contents to be displayed;

a graphic information memory for storing information related to a graphic to be drawn on the screen, the stored information for the graphic to be drawn including a graphic shape type and two coordinates of a graphic frame rectangle, the graphic frame rectangle having the graphic totally circumscribed therein, the two coordinates being coordinates of both endpoints of a diagonal of the graphic frame rectangle; and a graphic selection processor which performs a comparison of the two coordinates of the graphic frame rectangle and the region to be displayed on the screen, and which, in accordance with the comparision, includes the graphic to be drawn on the screen by adding the graphic to be drawn to the contents to be displayed.

2. The graphic drawing apparatus of claim 1, wherein the apparatus further comprises:

graphic drawing means for setting the information related to a graphic in response to the movement of a cursor on the screen; and editing means capable of editing the information related to a graphic which is stored in said graphic information memory.

3. The graphic drawing apparatus of claim 1, wherein the diagonal has a positive slope.

4. The graphic drawing apparatus of claim 2, wherein parameters of each graphic stored in the graphic information memory are represented by relative coordinates within the drawing range.

5. The graphic drawing apparatus of claim 2, wherein graphic information converted to numerical information on the basis of display information representing a display state of a region to be displayed on the screen can be edited by the editing means.

6. The graphic drawing apparatus of claim 1, wherein the graphic information memory has information related to a plurality of graphics stored therein for which the graphic shape type is at least two of the following: point, line, polygon, series of connected lines.

* * * * *